United States Patent [19]
Post et al.

[11] Patent Number: 6,021,440
[45] Date of Patent: Feb. 1, 2000

[54] METHOD AND APPARATUS FOR COALESCING AND PACKETIZING DATA

[75] Inventors: Lauren L. Post, Pflugerville, Tex.; Raymond E. Losinger, Endicott, N.Y.

[73] Assignee: International Business Machines Corporation, Armonk, N.Y.

[21] Appl. No.: 08/854,060

[22] Filed: May 8, 1997

[51] Int. Cl.[7] .................................................. G06F 13/00
[52] U.S. Cl. ........................ 709/231; 348/423; 370/473
[58] Field of Search .................... 348/423, 465, 348/419, 462, 473, 474; 370/263, 412, 468, 473, 498, 509; 709/231, 200, 201, 203, 217, 218, 219

[56] References Cited

U.S. PATENT DOCUMENTS

| | | | |
|---|---|---|---|
| 4,920,534 | 4/1990 | Adelmann et al. | 370/94 |
| 5,276,684 | 1/1994 | Pearson | 370/94 |
| 5,450,410 | 9/1995 | Hluchyj et al. | 370/94 |
| 5,483,526 | 1/1996 | Ben-Nun et al. | 370/60 |
| 5,483,640 | 1/1996 | Isfeld et al. | 395/200 |
| 5,491,800 | 2/1996 | Goldsmith et al. | 395/200 |
| 5,502,573 | 3/1996 | Fujinami | 386/65 |
| 5,511,054 | 4/1996 | Oishi et al. | 369/59 |
| 5,519,699 | 5/1996 | Ohsawa | 370/60 |
| 5,521,918 | 5/1996 | Kim | 370/428 |
| 5,528,587 | 6/1996 | Galand et al. | 370/60 |
| 5,541,920 | 7/1996 | Angle et al. | 370/61 |
| 5,561,466 | 10/1996 | Kiriyama | 348/423 |
| 5,561,791 | 10/1996 | Mendelson et al. | 395/550 |
| 5,574,885 | 11/1996 | Denzel et al. | 395/872 |
| 5,583,652 | 12/1996 | Ware | 386/75 |
| 5,596,564 | 1/1997 | Fukushima | 386/46 |
| 5,715,356 | 2/1998 | Hirayama | 386/96 |
| 5,726,989 | 3/1998 | Dokic | 370/509 |
| 5,754,729 | 5/1998 | Fujinami | 386/124 |
| 5,758,011 | 5/1998 | Fujinami | 386/98 |
| 5,802,239 | 9/1998 | Fujinami | 386/47 |
| 5,846,973 | 1/1999 | Thompson | 370/389 |
| 5,872,933 | 2/1999 | Kanai et al. | 709/231 |

FOREIGN PATENT DOCUMENTS

| | | |
|---|---|---|
| 0 235 484 | 9/1987 | European Pat. Off. . |
| 0 609 128 A1 | 1/1993 | European Pat. Off. . |
| WO 95/22233 | 8/1995 | European Pat. Off. . |
| WO 96/15598 | 5/1996 | European Pat. Off. . |
| 7-107116 | 4/1995 | Japan . |
| 7-177179 | 7/1995 | Japan . |

*Primary Examiner*—Moustafa M. Meky
*Attorney, Agent, or Firm*—Duke W. Yee; Jeffrey S. LaBaw

[57] ABSTRACT

A method and apparatus for processing a transport stream. A transport stream is received in a data processing system in which the transport stream contains data packets. These data packets include audio data and video data. Data from the data packets in the transport stream are placed into a data packet having a selected size. The selected size of the data packet is limited using a threshold and data from the transport stream, wherein the selected sized of the data packet is optimized for processing within the data processing system.

39 Claims, 12 Drawing Sheets

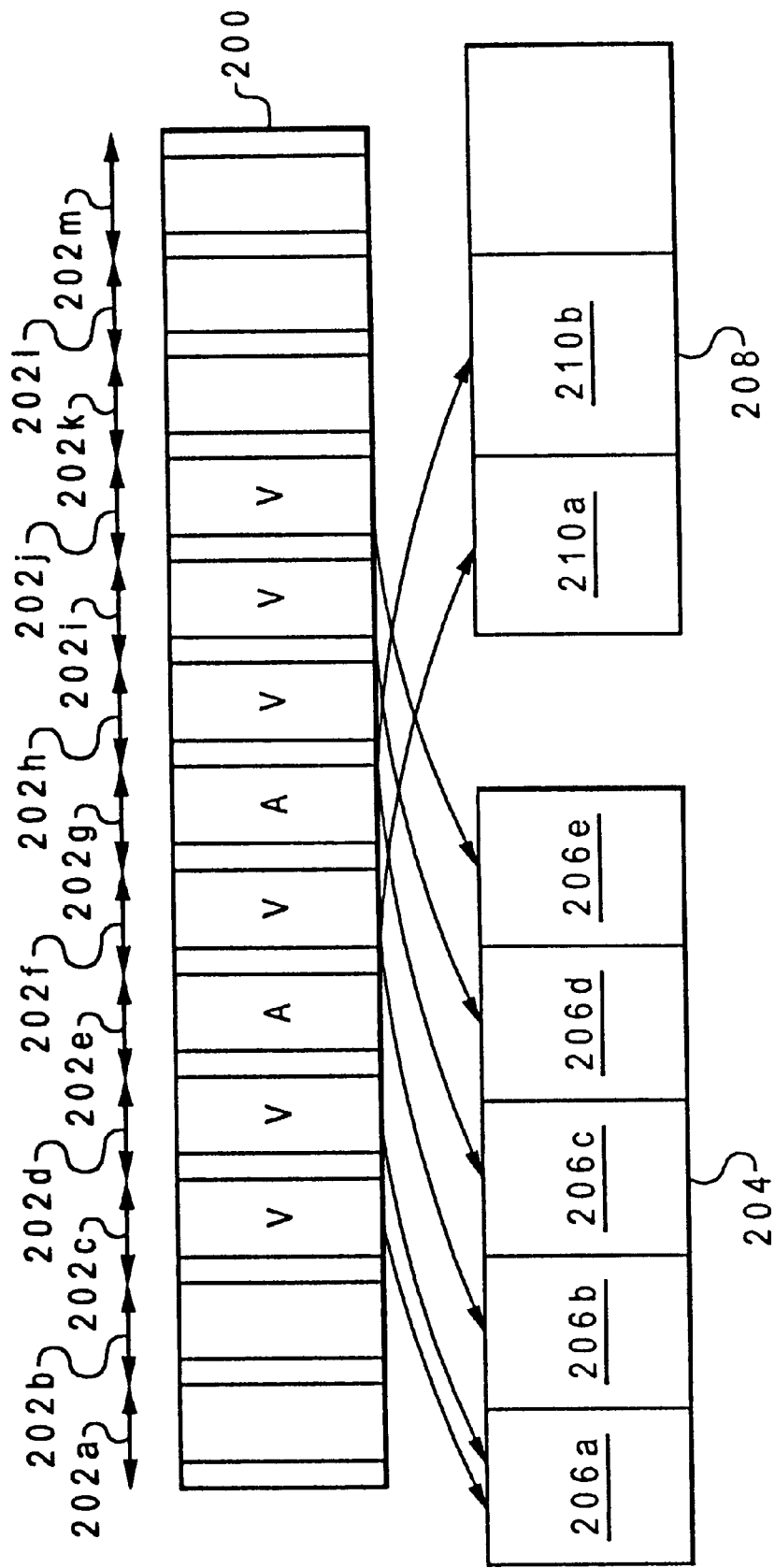

METHOD AND APPARATUS FOR COALESCING AND PACKETIZING DATA

BACKGROUND OF THE INVENTION

1. Technical Field

The present invention relates generally to an improved data processing system and in particular to a method and apparatus for processing a data stream in a data processing system. Still more particularly, the present invention relates to a method and apparatus for processing a transport stream including audio and video data.

2. Description of the Related Art

Multimedia, the presentation or transfer of information through more than one medium at any time, is a fast growing segment of the computer industry with many applications being developed, which incorporate various features of multimedia. Additionally, many businesses are using multimedia to present information to consumers. Multimedia combines different forms of media in the communication of information to a user through a data processing system, such as a personal computer. A multimedia application is an application that uses different forms of media within a single application. For example, multimedia applications may communicate data to a user through a computer via audio and video simultaneously. Such multimedia applications are usually bit intensive, real time, and very demanding, requiring ample processing power in the data processing system. Users may access in the multimedia, for example, in the form of video games or movies on a digital video disk (DVD) or through a communications link.

The Motion Picture Experts Group (MPEG) standard is a well-known standard for synchronizing reading and playback of compressed digital, audio and video data streams. With MPEG-2 data, two types of data streams are present, either program streams or transport streams. The transport stream is a stream definition which is tailored for communicating or storing one or more programs of coded data according to ITU-T Rec. H.262 | ISO/IEC 13818-2 and ISO/IEC 13818-3 and other data in environments in which significant errors may occur. Such errors may be manifested as bit value errors or loss of packets. Transport streams may be either fixed or variable rate. In either case, the constituent elementary streams may either be fixed or variable rate. The program stream is a stream definition which is tailored for communicating or storing one program of coded data and other data in environments where errors are very unlikely, and where processing of system coding, e.g., by software, is a major consideration.

Transport streams are meant to be sent over networks and are separated into 188 byte transport packets. These small amounts of data do not work well unless coalesced into bigger packets, especially when the data is ultimately sent down to hardware, which requires the data to be separated into special areas such as packetize elementary stream (PES) packet starts and presentation time stamp (PTS) changes. Each of these smaller packets causes an interrupt at the hardware level. With smaller packets, more interrupts occur, requiring increased central processing unit performance to handle the increased number of interrupts. PTS is a value in a field that may be present in a PES packet header that includes the time that a presentation unit (a decoded audio access unit for an audio frame or a decoded picture) is presented in the system target decoder. Standards for PES and generic coding of moving pictures and associated audio system may be found in ISO/IES 13818-1.

Transport streams also cause much overhead because of the small amounts of data. Each 188 byte transport packet includes a 4 byte header, leaving 184 bytes of data to be sent to hardware. Sending 184 byte packets to hardware is undesirable because of the amount of data for just one video frame usually is about fifty kilobytes of data. Therefore, it would be advantageous to have an improved method and apparatus for handling transport packets.

SUMMARY OF THE INVENTION

It is one object of the present invention to provide an improved data processing system.

It is another object of the present invention to provide a method and apparatus for processing a data stream in a data processing system.

It is yet another object of the present invention to provide a method and apparatus for processing a transport stream including audio and video data.

The foregoing objects are achieved as, is now described. The present invention provides a method and apparatus for processing a transport stream. A transport stream is received in a data processing system in which the transport stream contains data packets. These data packets include audio data and video data. Data from the data packets in the transport stream are placed into a data packet having a selected size. The selected size of the data packet is limited using a threshold and data from the transport stream, wherein the selected sized of the data packet is optimized for processing within the data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a block diagram of buffers according to the present invention;

DESCRIPTION OF PREFERRED EMBODIMENT

Figure 1A:
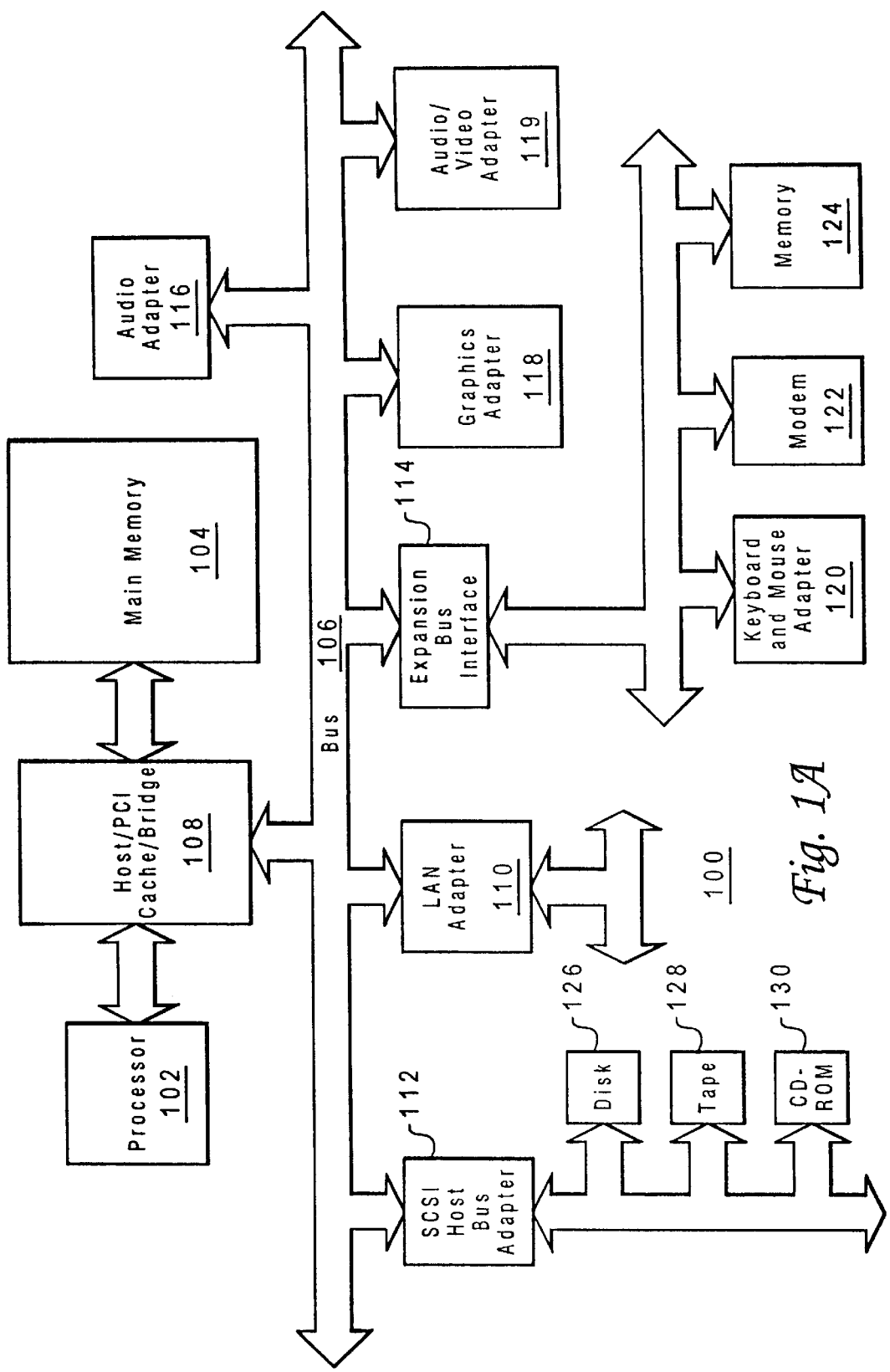
FIG. 1A is a block diagram of a data processing system in the present invention may be implemented.

With reference now to the figures, and in particular with reference to FIG. 1A, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. The depicted example includes four loads on the mother board and three expansion slots. Those of ordinary skill in the art will appreciate that the hardware in FIG. 1A may vary. For example, other peripheral devices, such as optical disk drives and the like may be used in addition to or in place of the hardware depicted in FIG. 1A. The depicted example is not meant to imply architectural limitations with respect to the present invention.

Figure 1B:
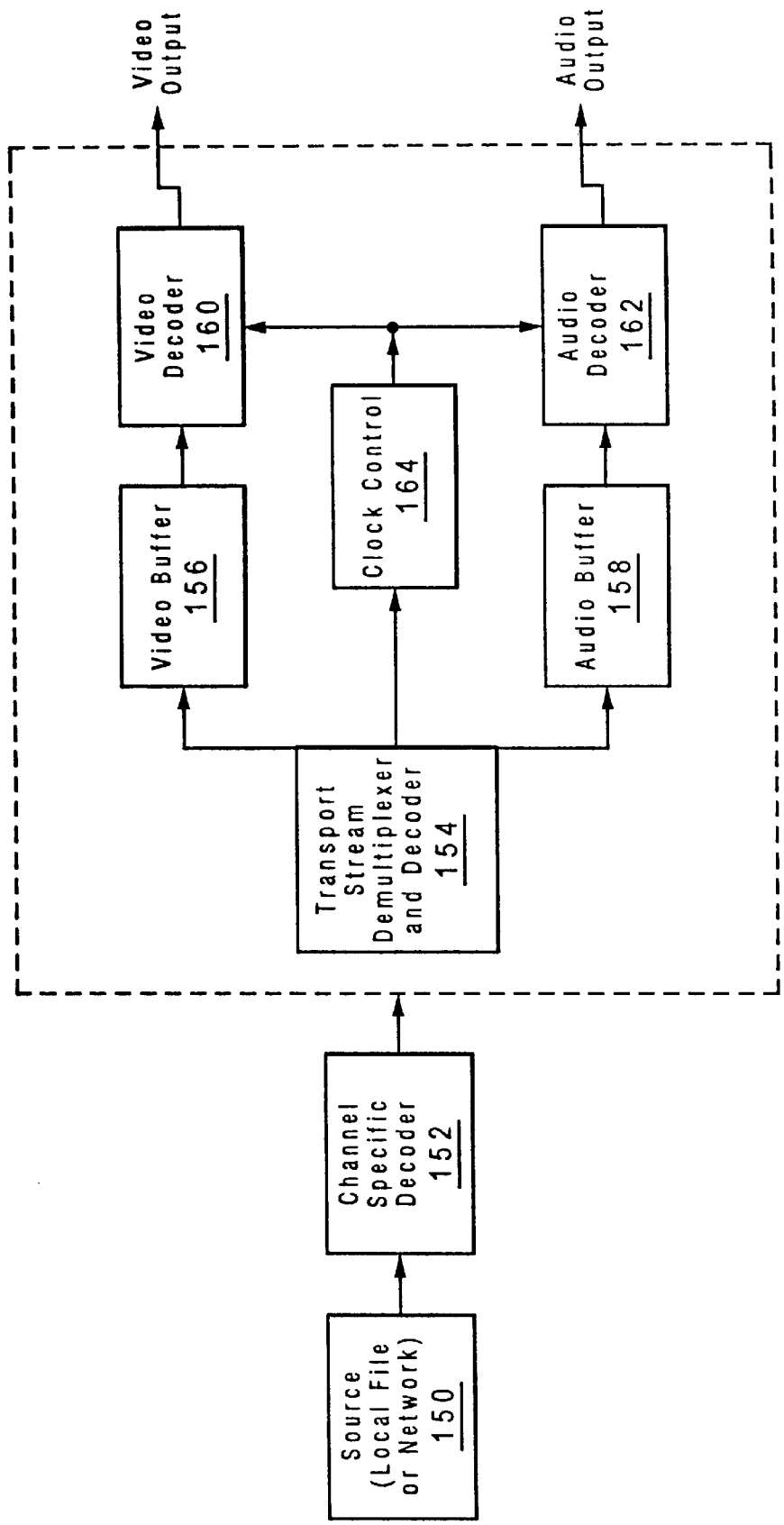
FIG. 1B is a block diagram of a audio/video adapter in which the present invention may be implemented.

In FIG. 1B, a block diagram of an audio/video adapter is depicted from FIG. 1A according to the present invention. A/V adapter 119 has an input connected to source 150 which may be a digital storage media, such as hard disk 126 or CD-ROM 130. Alternatively, source 150 may be a data stream from a remote source received through LAN adapter 110. A/V adapter 119 produces a transport stream at channel specific decoder 152 from data received at a channel coupled to the input of channel specific decoder 152.

The transport stream may contain one or multiple programs. This transport stream is demulliplexed and decoded by transport stream demultiplexer and decoder 154. The video data is sent to video buffer 156 and audio data is sent to audio buffer 158. Video decoder 160 is employed to synchronize and decode or drop video frames to produce a video output. Audio decoder 162 is employed to decode audio to create an audio output for the multimedia presentation. The decoding of video data by video decoder 160 and audio data by audio decoder 162 is controlled by clock control unit 164, which is in turn controlled by transport stream demultiplexer and decoder 154. PTSs from the decoded data is used to control clock control unit 164. The decoding performed by A/V adapter 119 may be implemented using the MPEG standard. The processes of the present invention may be implemented within A/V adapter 119.

Figure 1C:
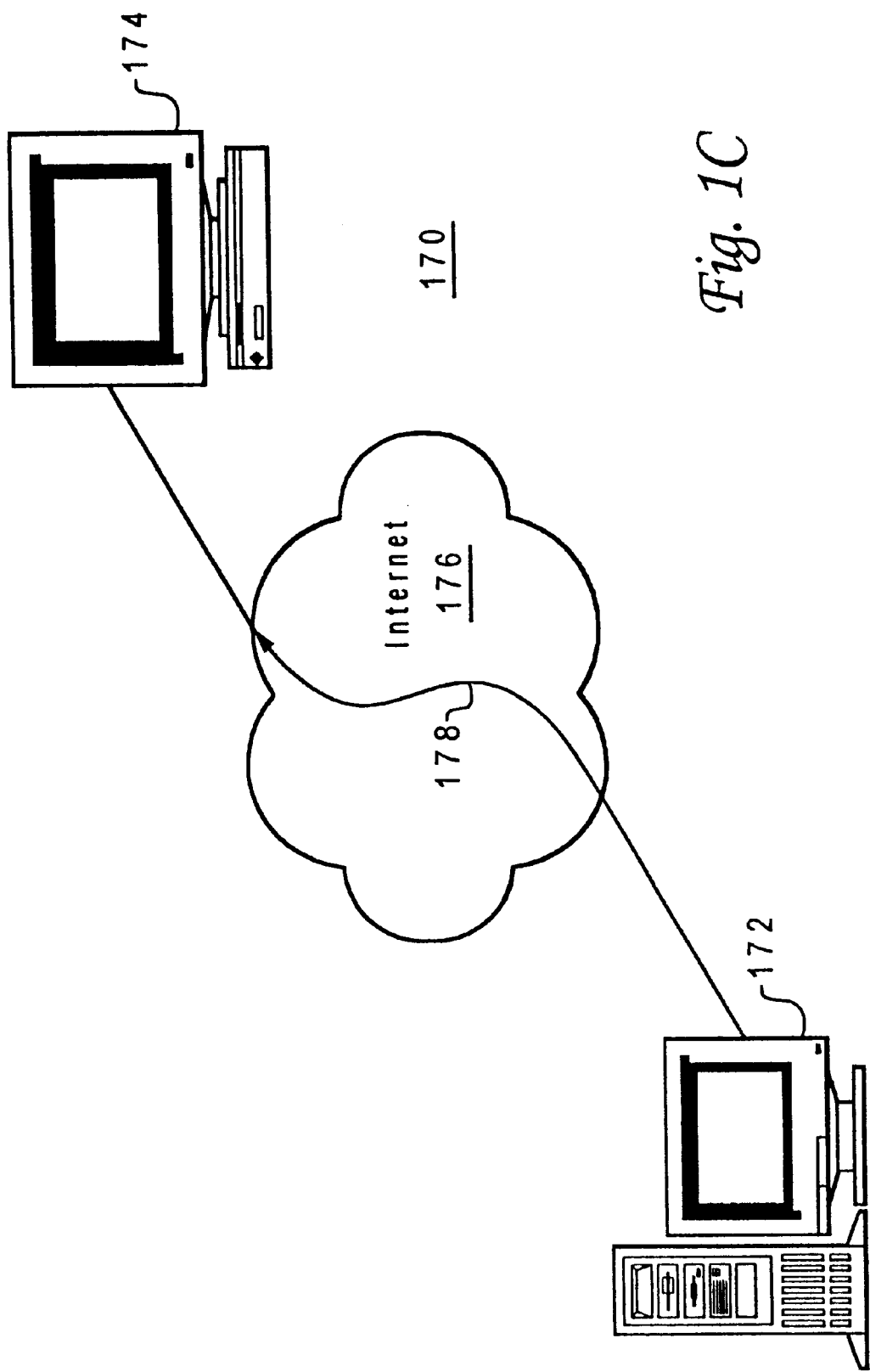
FIG. 1C is a block diagram of a communications system in which the present invention may be implemented.

With reference to FIG. 1C, a communications system is depicted in which the present invention may be implemented. Communication system 170 includes a source data processing system 172 and a target data processing system 174 connected to each other through internet 176. Source data processing system 172 may be for example, a server containing audio/visual programs that may be distributed to subscribers at target data processing systems, such as target data processing system 174, through a transport stream in the form of a MPEG-2 data stream 178. Although the depicted example illustrates a network in the form of internet 176 as providing the connection between source data processing system 172 and target data processing system 174, other types of distributed networks may be employed. The processes of the present invention are implemented within target data processing system 174. Target. data processing system 174 may be a data processing system, such as data processing system 100 in FIG. 1A.

Turning now to FIG. 2, a block diagram of buffers are depicted according to the present invention. In the depicted example, data buffer 200 contains data packets 202a–202m. Video stream data buffer 204 contains data packets 206a–206e while audio stream data buffer 208 contains data packets 210a and 210b in the depicted example. Each of the data packets in data buffer 200 contains data that may be skipped in creating data packets for video stream data buffer 204 and audio stream data buffer 208. In particular, the first four bytes of data in the data buffer contain information about the data stream. This information is not placed into video stream data buffer 204 or audio stream data buffer 208. Additionally, the PES packet headers and data that is not video or audio data also is skipped in creating data packets for video stream data buffer 204 and audio stream data buffer 208.

In the depicted example, data from data packet 202c and data packet 202d in data buffer 200 are coalesced to form data packet 206a in video stream data buffer 204. Data from data packet 202e is placed into data packet 210a with data from data packet 202g being placed into data packet 210b in audio stream data buffer 208. Data from data packet 202f is used to form data packet 206b. Data from data packet 202h is used to form data packet 206c. Data from data packet 202i is used to form data packet 206d in video stream data buffer 204. Data packet 202j in data buffer 200 is employed to form data packet 206e in video stream data buffer 204.

Figure 3:
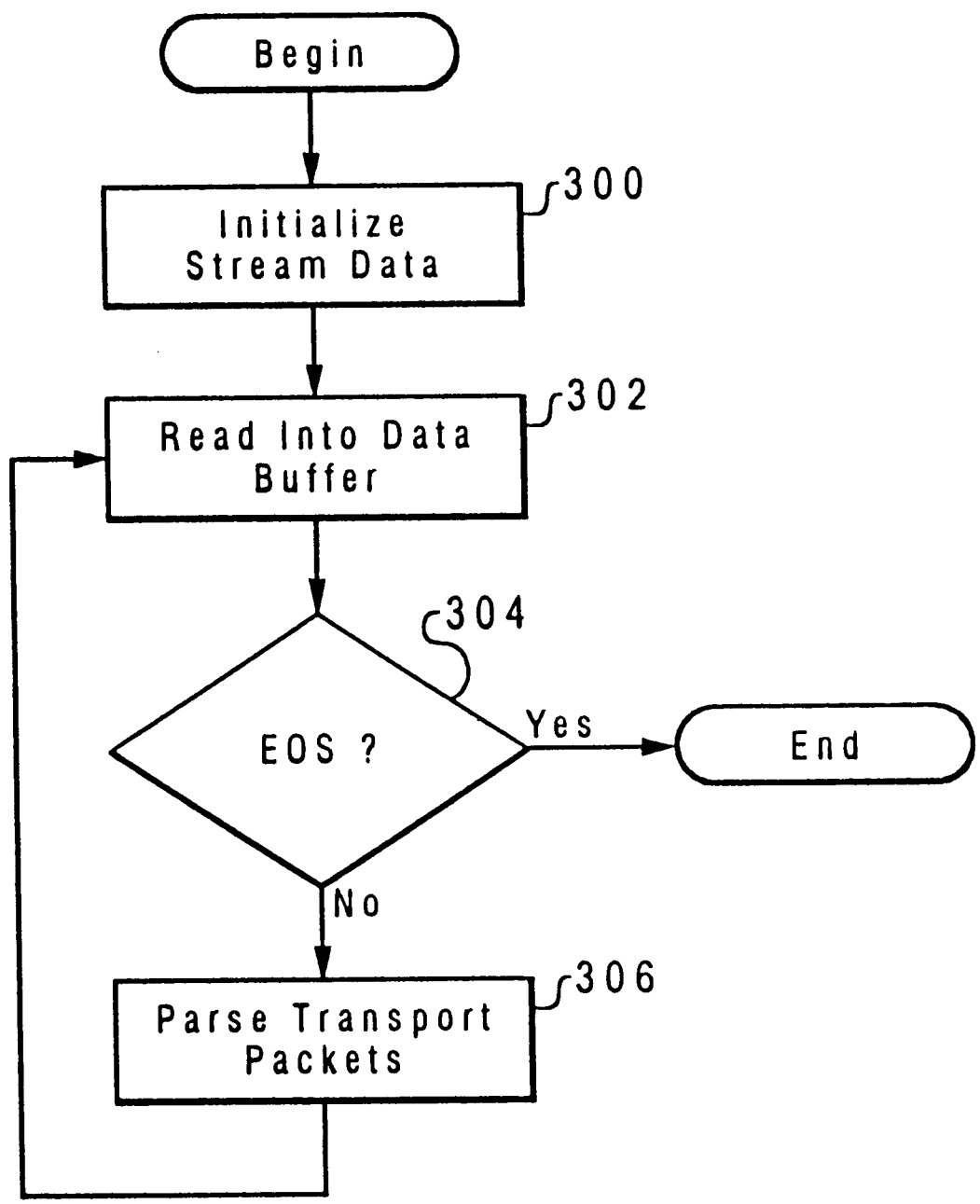
FIG. 3 is a flowchart of the main loop used in coalescing data packets according to the present invention.

With reference now to FIG. 3, a flowchart of the main loop used in coalescing data packets is depicted according to the present invention. The process begins by initializing the stream data (step 300). Thereafter, data is read into the data buffer (step 302). Thereafter, a determination is made as to whether the end of stream (EOS) has been reached in reading data into the buffer (step 304). If EOS has not been reached, the process parses the transport packets in the data buffer (step 304) with the process then returning to step 302. Upon encountering an EOS in the data buffer, the process then terminates.

Figure 4:
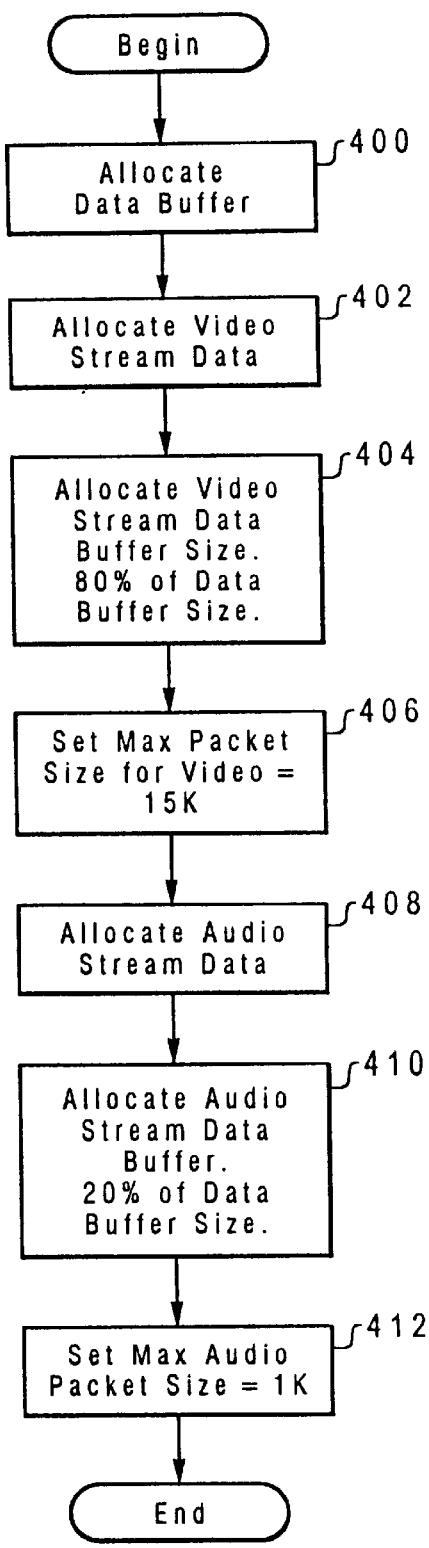
FIG. 4 is a flowchart of a process for initializing stream data according to the present invention.

Turning now to FIG. 4, a flowchart of a process for initializing stream data is depicted according to the present invention. FIG. 4 is a more detailed description of step 300 in FIG. 3. The process begins by allocating a data buffer (step 400) and then allocating a video data stream (step 402). In the depicted example, a data buffer size of 500K is used. Those of ordinary skill in the art will realize that the data buffer size can be variable depending on the application. Thereafter, a video stream data buffer is allocated that has a size that is about eighty (80%) percent of the data buffer size (step 404). Thereafter, the variable Max Packet Size for video packets is set by setting the variable Max Packet Size equal to 15K bytes (step 406). The maximum packet size for the video packets could be set to other sizes depending on the implementation and hardware being used. Thereafter, the process allocates audio stream data (step 408) and allocates an audio stream data buffer that is twenty (20%) percent of the data buffer size (step 410). Typically, much more video data is present than audio data. As a result, in most cases, the allocation of an audio stream data buffer as a percentage of the data buffer size may vary from about fifteen (15%) percent to about twenty-five (25%) percent. Likewise, the allocation of the video data stream buffer as a percentage of the data buffer size may vary about seventy-five (75%) percent to about eighty-five (85%) percent. The percentages depend on the configuration of the data processing system and specific percentages, may be determined by testing performance of the data processing system. The audio stream buffer is a buffer like the video stream buffer except the audio stream buffer does not have to be as large as the video stream buffer because less audio data is present for processing. Then, the maximum audio packet size is set by setting the variable Max Audio Packet equal to one kilobyte (step 412) with the process terminating thereafter. Of course, other maximum sizes may be set for audio packets, depending on the application and hardware present.

Figure 5:
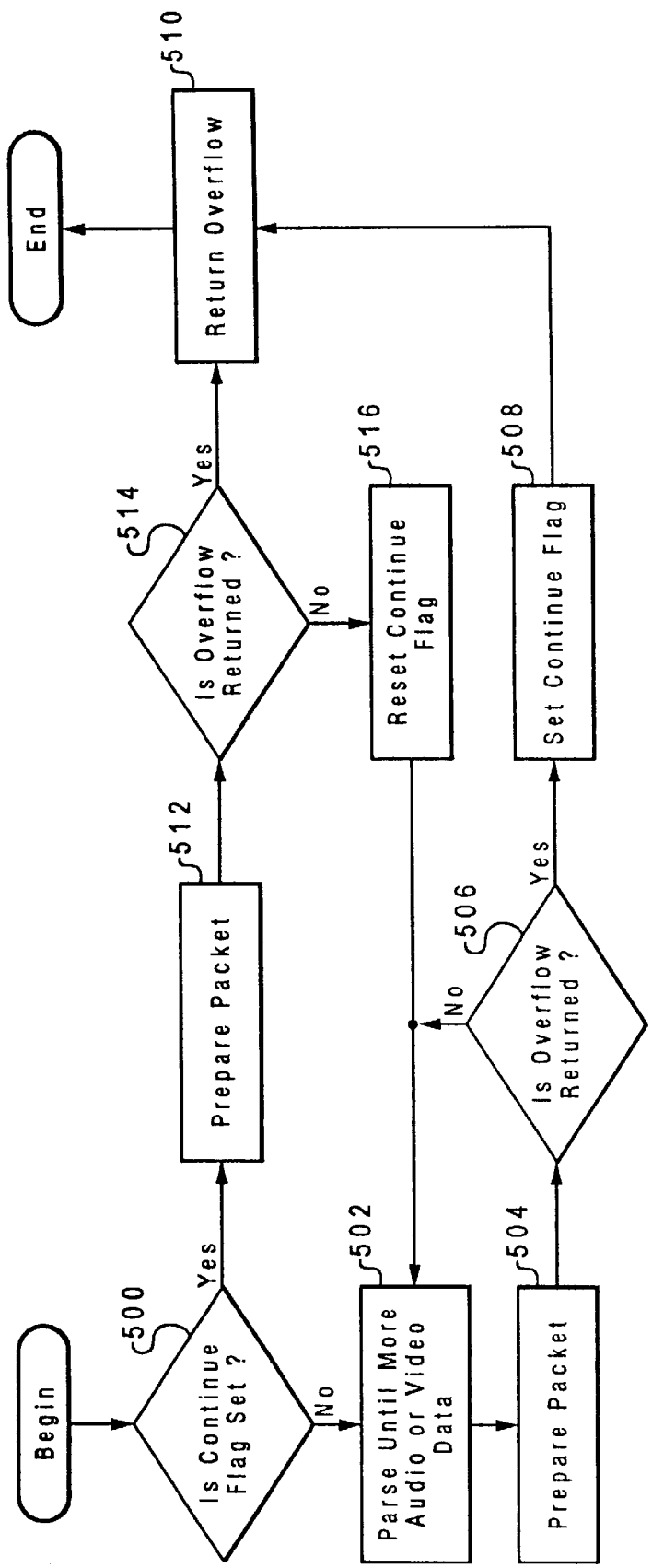
FIG. 5 is a flowchart of a process for parsing transport packets from the data buffer according to the present invention.

Turning now to FIG. 5, a flowchart of a process for parsing transport packets from the data buffer is depicted according to the present invention. The process begins by determining whether the continue flag is set (step 500). If the continue flag is not set, the process then parses until more video or audio data is found (step 502).

Next, the packet is prepared (step 504) and a determination is made as to whether an overflow has been returned (step 506). Preparing of a packet is described in more detail in FIG. 6 below. If an overflow has not been returned, the process returns to step 502 and parses until more video or audio data is found. Upon the return of an overflow, the continue flag is set (step 508) and the process returns in overflow (step 510) with the process terminating thereafter.

With reference again to step 500, if the continue flag is set, then the packet is prepared (step 512). Next, a determination is made as to whether an overflow has been returned in response to preparing the packet (step 514). If an overflow has not been returned, the continue flag is reset (step 516) and the process returns to step 502. Otherwise, the process returns an overflow as described in step 510 and terminates.

Figure 6:
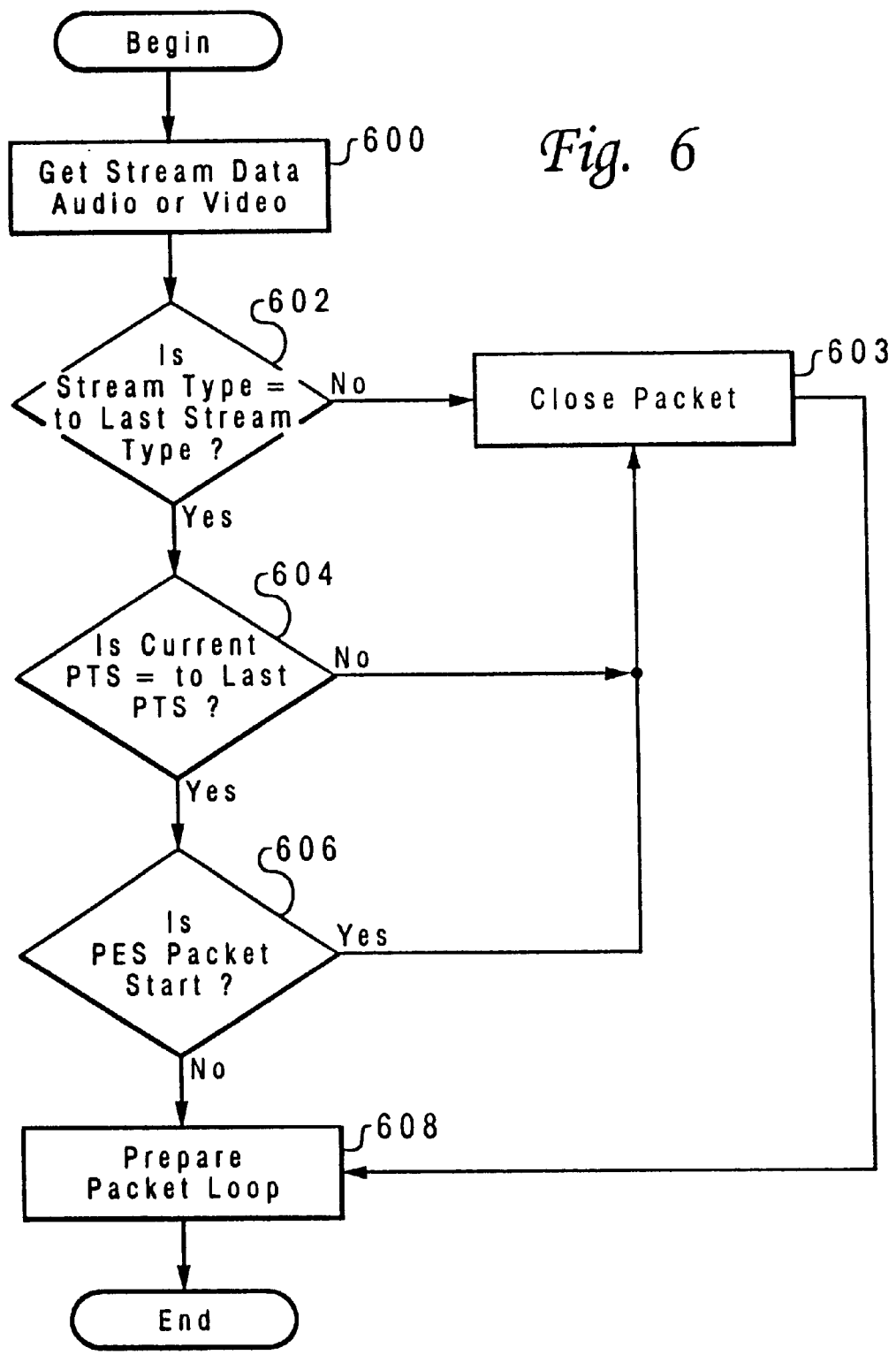
FIG. 6 is a flowchart of a process for preparing packets according to the present invention.

Turning next to FIG. 6, a flowchart of a process for preparing packets is depicted according to the present invention. FIG. 6 is a more detailed description of steps 504 and 512 in FIG. 5. The process begins by obtaining stream data either audio or video (step 600). Next, a determination is made as to whether the stream type is equal to the last stream type (step 602). If the stream type is not equal to the last stream type, the process then closes the packet (step 603) and proceeds to step 608 to prepare a packet loop. Otherwise, a determination is made as to whether the current presentation time stamp (PTS) is not equal to the last PTS (step 604). If the current PTS is equal to the last PTS, then the process determines whether a PES packet start is present (step 606). If a PES packet start is not present, the process then prepares a packet loop (step 608) with the process then terminating. With reference again to steps 604 and 606, if the current PTS is not equal to the last PTS or a PES packet: start is present, the process in both cases proceeds to step 603 as described above.

Figure 7:
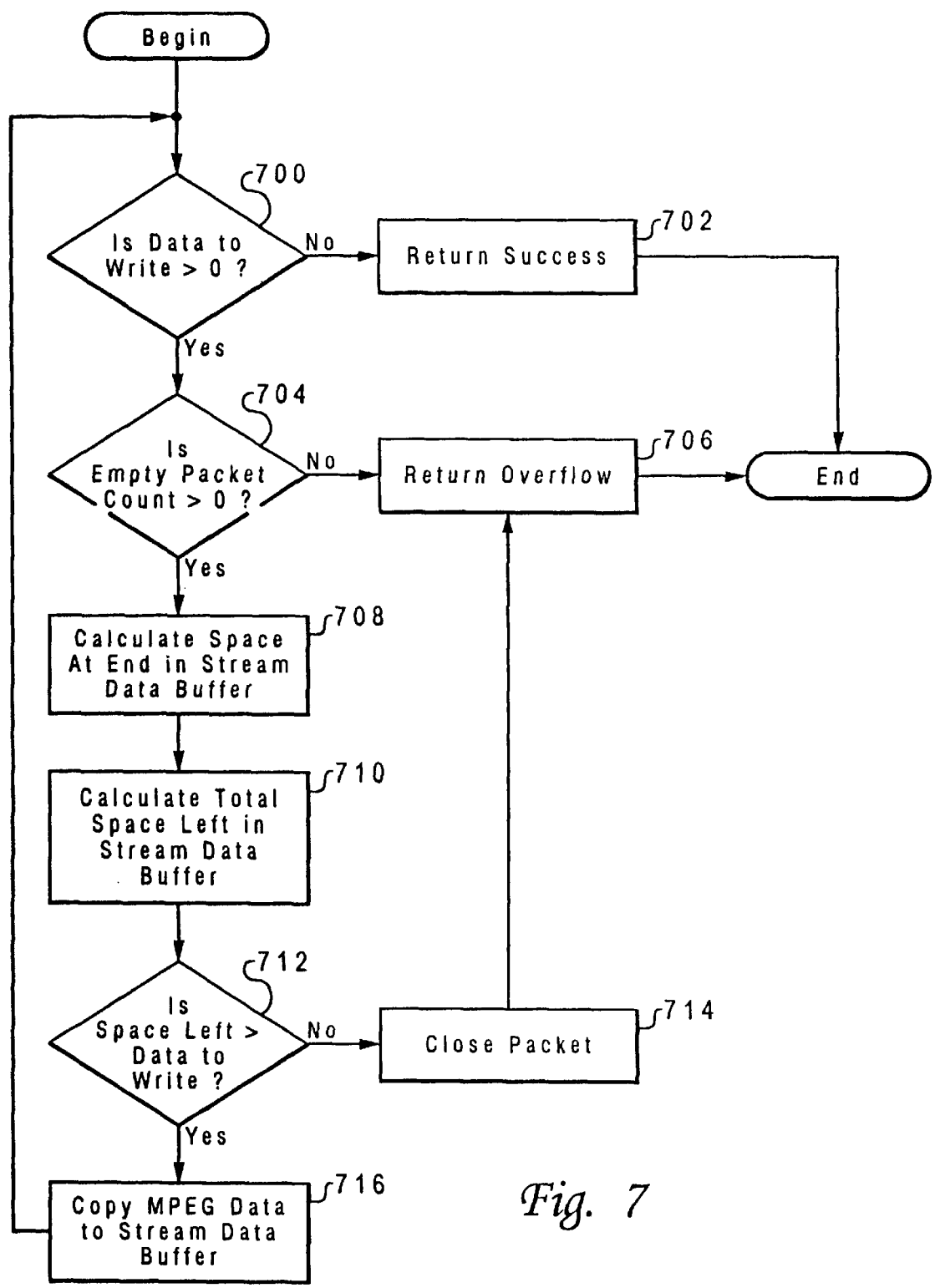
FIG. 7 is a flowchart of a process for preparing a packet loop according to the present invention.

With reference now to FIG. 7, a flowchart of a process for preparing a packet loop is depicted according to the present invention. FIG. 7 is a more detailed description of step 608 in FIG. 6. The process begins by determining whether the data to write is greater than zero (step 700). If the data to write is not greater than zero, the process then returns an indication of success (step 702) with the process then terminating. Otherwise, the process then makes a determination as to whether the empty packet count is greater than zero (step 704). If the empty packet count is not greater than zero, the process then returns an overflow (step 706) with the process then terminating. If on the other hand, the empty packet count is greater than zero, the process then calculates the space at the end in the stream data buffer (step 708). Then, the process calculates the total space left in the stream data buffer (step 710).

Thereafter, a determination is made as to whether space is left is greater than the data that is to be written (step 712). If the space left is not greater than the data to be written, the process then closes the packet (step 714) with the process then proceeding to step 706 to return an indication of an overflow. Closing a packet increments the process to the next packet in which data is to be placed. In the depicted example, an array of packets is provided with an index pointing to the available packet. Closing a packet also decrements the empty packet count. The releasing of a packet increments the empty packet count. Additionally, a count of all packets may be tracked and the empty packet count is decremented. With reference again to step 712, if the space left in the stream data buffer is greater than the data to be written to the buffer, the process then copies MPEG data to the stream data buffer (step 716) with the process then returning to step 700 as previously described.

Figure 8:
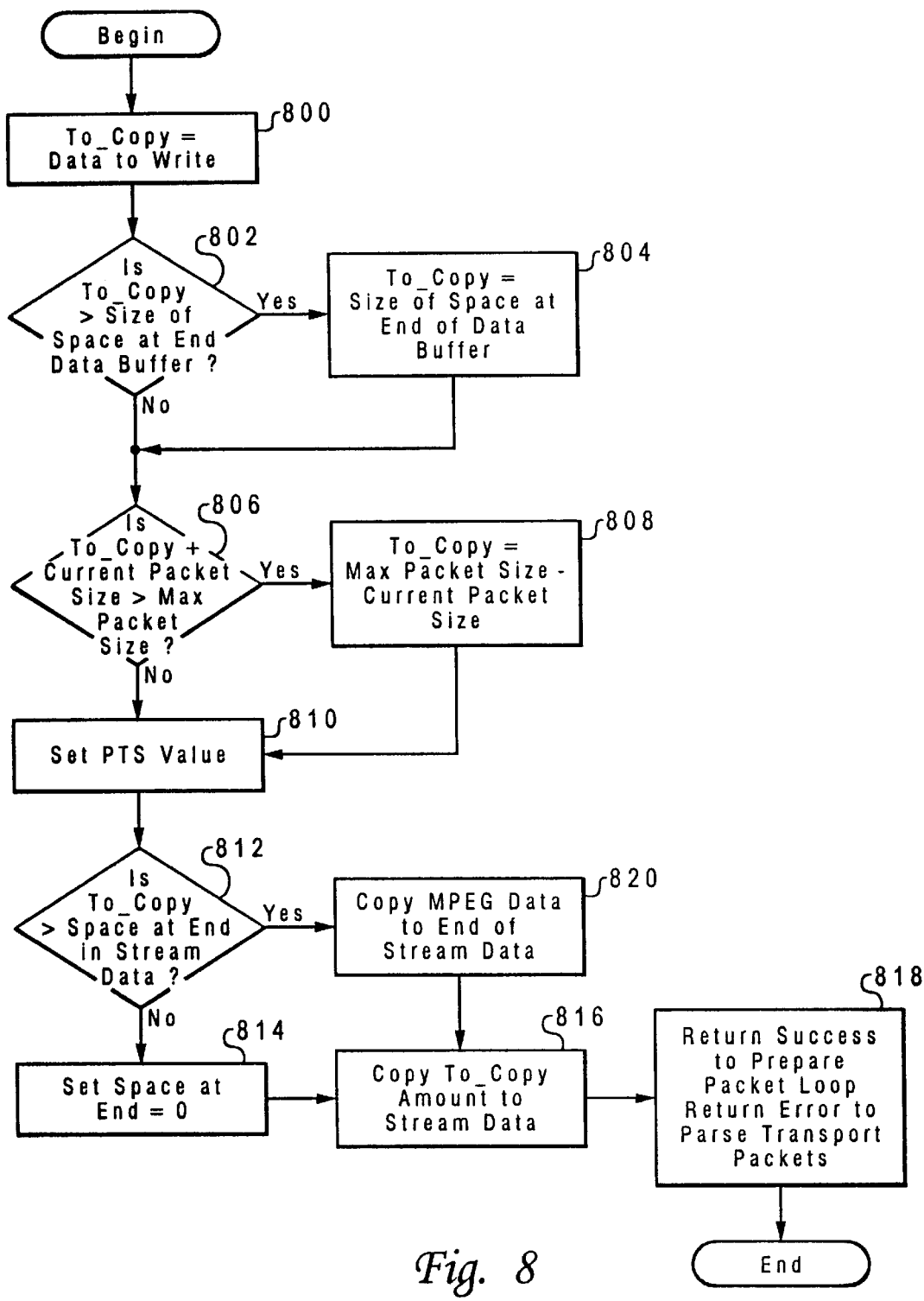
FIG. 8 is a flowchart of a process for copying MPEC data according to the present invention.

With reference now to FIG. 8, a flowchart of a process for copying MPEG data is depicted according to the present invention. FIG. 8 is a more detailed description of step 716 in FIG. 7. The process begins by setting the variable To__Copy equal to data to write (step 800). Thereafter, a determination is made as to whether the To__Copy variable is greater than the size of space at the end of the data buffer (step 802). If the To__Copy variable is greater than the size of space at the end of the data buffer, the process then sets the To__Copy variable to the size of space at the end of the data buffer (step 804) with the process then proceeding to determine whether the To__Copy variable plus the current packet size is greater than the maximum packet size (step 806). If the To__Copy variable is not greater than the size of space at the end of the buffer, the process proceeds directly to step 806.

If the To__Copy variable plus the current packet size is greater than the maximum packet size, the process then sets the To__Copy variable equal to the maximum packet size minus the current packet size (step 808). Thereafter, the process sets the PTS value (step 810). The process proceeds directly to step 810 from step 806, if the To Copy variable plus the current packet size is not greater than the maximum packet size, the process then proceeds directly to step 810 to set the PTS value. Next, the process determines whether the To__Copy variable is greater than the space at end in the stream data (step 812). If the To__Copy variable is not greater than the space at end in the stream data, the process then sets the space at end equal to zero (step 814). Then, an amount of data equal to the To__Copy variable is copied to the stream data (step 816) with the process then returning a success to the prepare packet loop and returning an error to the parse transport packet procedure (step 818). Then, the process terminates.

With reference again to step 812, if the To__Copy variable is greater than the space at the end in the stream data, the process then copies MPEG data to the end of stream data (step 820) with the process then proceeding to step 816 as described above. The next copy will be to the beginning of the stream data buffer.

Figure 9:
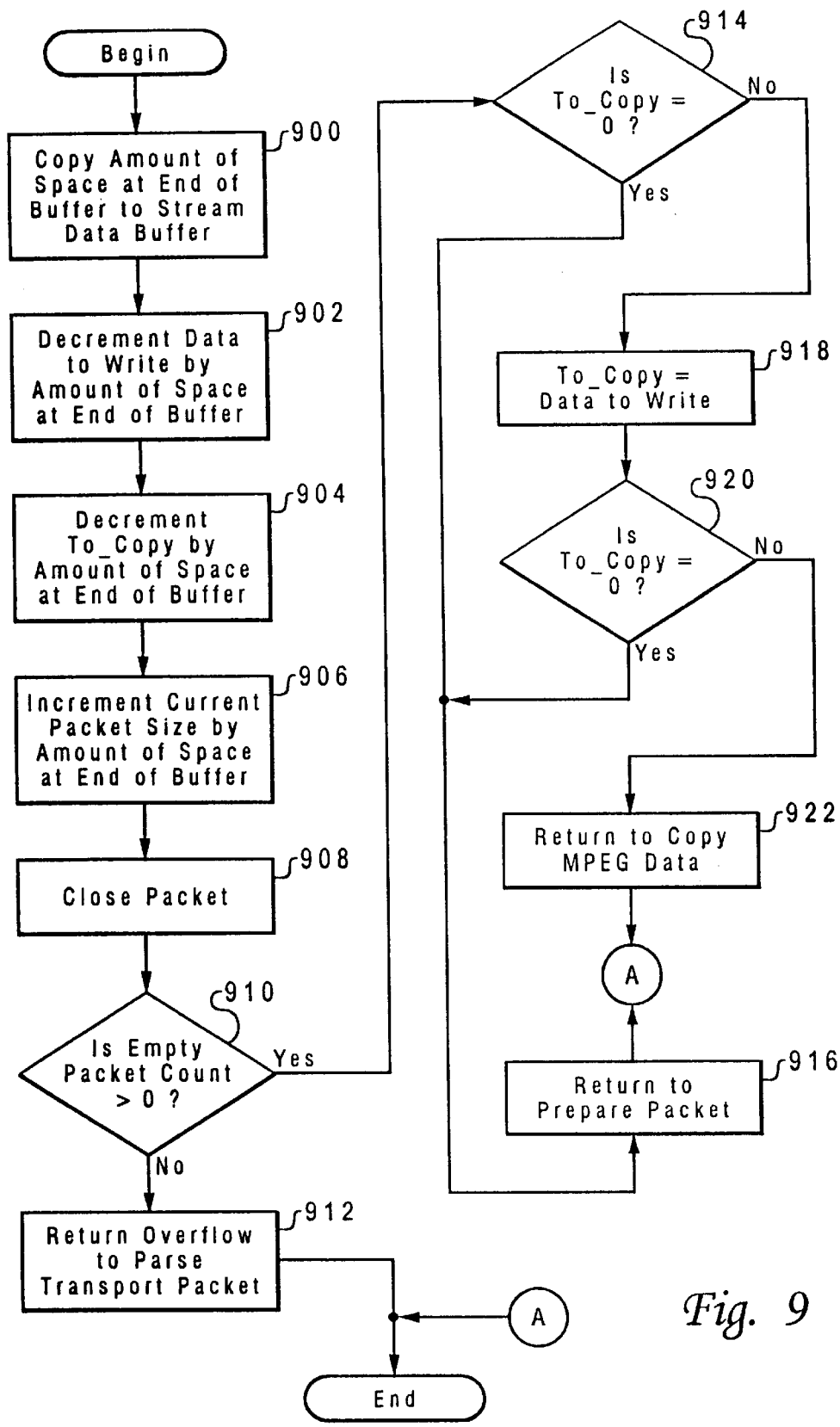
FIG. 9 is a flowchart of a process to copy MPEG to the end of the stream data buffer according to the present invention.

With reference now to FIG. 9, a flowchart of a process to copy MPEG to the end of the stream data buffer is depicted according to the present invention. This flowchart is a more detailed description of step 8213 in FIG. 8. The process begins by copying the space at end amount of data to the stream data buffer (step 900). In step 900, the amount of data equal to the amount of space at the end of the buffer is copied to the point in the buffer where the space at the end of the buffer starts. Next, the data to write is decremented by the space at end variable (step 902), and the To_Copy variable is decremented by the space at end variable (step 904). Next, the current packet size is incremented by the space at end variable (step 906). The process then closes the packet (step 908) and determines whether the empty packet count is greater than zero (step 910). If the empty packet count is not greater than zero, the process then returns an overflow indication to the parse transport packet process (step 912) with the process then terminating.

With reference again to step 910, if the empty packet count is greater than zero, a determination is then made as to whether the To_Copy variable is equal to zero (step 914). If the To_Copy variable is equal to zero, the process then returns to prepare the packet (step 916) with the process then terminating. Otherwise, the process sets the To_Copy variable equal to the data to write (step 918), and then a determination is made as to whether the To_Copy variable is equal to zero (step 920). If at this point the To_Copy variable is set equal to zero, the process then proceeds to step 916 as described above. Otherwise, the process returns to copy MPEG data step 922 with the process then terminating.

Figure 10:
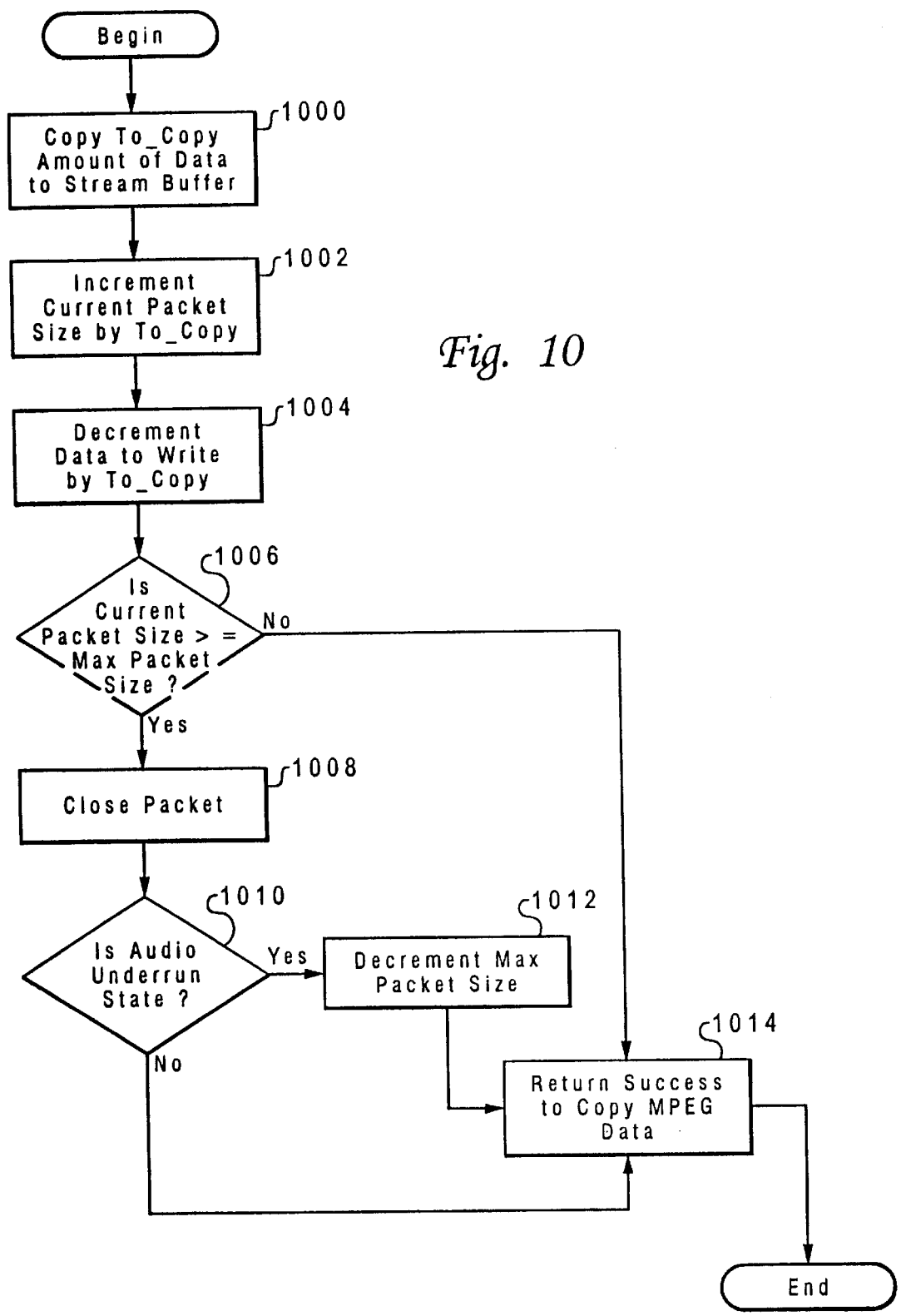
FIG. 10 is a flowchart of a process for copying the To_Copy amount of data to a stream data buffer according to the present invention.

Turning now to FIG. 10, a flowchart of a process for copying the To_Copy amount of data to a stream data buffer is depicted according to the present invention. The process begins by copying the To_Copy amount of data to the stream data buffer (step 1000). Next, the current packet size is incremented by the To_Copy variable (step 1002), and the data to write is decremented by the To_Copy variable (step 1004). Then, a determination is made as to whether the current packet size is greater than or equal to the maximum packet size (step 1006). If the current packet size is greater than or equal to the maximum packet size, the process then closes the packet (step 1008). Then, a determination is made as to whether an audio underrun state is present (step 1010). If an audio underrun state is present, the maximum packet size is decremented (step 1012). The amount that the packet size is decremented is variable depending on the software and hardware present. In the depicted example, the maximum packet size may be decreased by fifty percent until a lower threshold, such as 1K, is reached. Then, the process returns an indication of success to the copy MPEG data process (step 1014) with the process then terminating.

With reference again to step 1010, if an audio underrun state is not present, the process proceeds to step 1014 directly. The process also proceeds directly to step 1014, if the current packet size is less than the maximum packet size in step 1006.

Thus, the present invention provides an improved method and apparatus for coalescing parts of a transport data stream into audio and video stream buffers. The present invention also provides an improved method and apparatus for packetizing the stream buffers into packets for transport to the hardware. Through the use of video stream buffer and an audio stream buffer in which the video stream buffer is greater than size of the audio stream buffer increased efficiency in parsing data is achieved. Additionally, by setting a maximum packet size for video and for audio, increased efficiency and coalescing parts of a transport data stream into audio and video stream buffers is achieved. The maximum packet size is employed to determine when to close a packet for consumption. Additionally, according to the present invention, the packets may not necessarily be the maximum packet size because packets may be closed in other instances, such as when the PTS changes value between transport packets, packet data is copied to the end of the stream data buffer, and data from the data buffer is at the end. Additionally, smaller than maximum packet size packets may be created when packet types change between audio and video data and when overflow situations occur after processing a packet. Smaller than maximum packet size packets also occur in response to PES packet starts occurring. Additionally, as audio underruns occur, the maximum packet size can be decreased such that packets can be closed and consumed faster. In such a situation, decreasing the maximum packet size by twenty-five (25%) down to fifty (50%) percent of the original packet size may help in various underrun cases where audio data is running low.

In the depicted example, the video stream buffer is eighty (80%) percent the size of the data buffer in which unparsed transport data stream is read into. Additionally, the audio stream buffer is set equal to twenty (20%) percent of the data buffer size. Also, maximum packet size in the depicted example are 15K for video and 1K for audio. This is optimum for MPEG-2 transport streams because much more video data than audio data is present. As a result, the setting of the buffer sizes and packets sizes allow for a balance in handling this type of data.

In the depicted example, coalescing of packets is performed in a circular buffer and as the buffer is filled, overflow situations can be handled so that future iterations as parts of the buffer are released can handle the past overflow data. The depicted example employs a circular buffer although other types of buffers may be implemented without an overflow occurring.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

We claim:

1. A method in a data processing system for processing a transport stream, the method comprising the data processing implemented steps of:

receiving a transport stream, wherein a plurality of data packets, containing audio data and video data, are in the transport stream;

placing data from the plurality of data packets in the transport stream into a data packet having a selected size;

limiting the selected size of the data packet using a threshold and data from the transport stream, wherein the selected size of the data packet is optimized for processing within the data processing system.

2. The method of claim 1, wherein data packet is a video packet.

3. The method of claim 1, wherein data packet is an audio packet.

4. The method of claim 1, wherein the step of placing data comprises:

placing the plurality of data packets from the transport stream in a data buffer;

placing audio data within the plurality of data packets in the buffer into an audio stream buffer; and placing video data within the plurality of data packets in the buffer into a video stream buffer.

5. The method of claim 4, wherein the data buffer has a size and wherein the video stream buffer is about eighty percent the size of the data buffer.

6. The method of claim 4, wherein the data buffer has a size and wherein the audio stream buffer is about twenty percent the size of the data buffer.

7. The method of claim 1, wherein the threshold includes a video threshold for video data and an audio threshold value for audio data.

8. The method of claim 7, wherein the audio threshold is one kilobyte of data such that the size of an audio packet is limited to a maximum size of one kilobyte of data.

9. The method of claim 7, wherein the video threshold is fifteen kilobytes of data such that the size of a video audio packet is limited to a maximum size of fifteen kilobytes of data.

10. The method of claim 1, wherein the step of limiting the selected size of the data packet using a threshold and data from the transport stream includes limiting the selected size of the data packet in response to encountering a presentation time stamp.

11. A data processing system for processing a transport stream comprising:

reception means for receiving a transport stream, wherein a plurality of data packets, containing audio data and video data, are in the transport stream;

placement means for placing data from the plurality of data packets in the transport stream into a data packet having a selected size;

limiting means for limiting the selected size of the data packet using a threshold and data from the transport stream, wherein the selected sized of the data packet is optimized for processing within the data processing system.

12. The data processing system of claim 11, wherein data packet is a video packet.

13. The data processing system of claim 11, wherein data packet is an audio packet.

14. The data processing system of claim 11, wherein the placement means comprises:

first means for placing the plurality of data packets from the transport stream in a data buffer;

second means for placing audio data within the plurality of data packets in the buffer into an audio stream buffer; and third means for placing video data within the plurality of data packets in the buffer into a video stream buffer.

15. The data processing system of claim 14, wherein the data buffer has a size and wherein the video stream buffer is about eighty percent the size of the data buffer.

16. The data processing system of claim 14, wherein the data buffer has a size and wherein the audio stream buffer is about twenty percent the size of the data buffer.

17. The data processing system of claim 11, wherein the threshold includes a video threshold for video data and an audio threshold value for audio data.

18. The data processing system of claim 17, wherein the audio threshold is one kilobyte of data such that the size of an audio packet is limited to a maximum size of one kilobyte of data.

19. The data processing system of claim 17, wherein the video threshold is fifteen kilobytes of data such that the size of a video audio packet is limited to a maximum size of fifteen kilobytes of data.

20. The data processing system of claim 11, wherein the limiting means includes means for limiting the selected size of the data packet in response to encountering a presentation time stamp.

21. The data processing system of claim 11, wherein the reception means is configured to be adapted to an internet.

22. The data processing system of claim 21, wherein the transport stream is received from a source connected to the internet.

23. The data processing system of claim 22, wherein the source is a data processing system.

24. The data processing system of claim 21, wherein the transport stream is an MPEG-2 data stream.

25. An apparatus for processing a transport stream comprising:

a data buffer;

an audio stream buffer;

a video stream buffer;

receiving means for receiving a transport stream having a plurality of data packets and for placing the plurality of data packets into the data buffer; and placement means for placing audio data into packets within the audio stream buffer and for placing video data into packets within the video stream buffer, wherein a size of the packets in the audio stream buffer and the video stream buffer are set using a threshold and data from the transport stream.

26. The apparatus of claim 25, wherein the size of the data packet in the audio stream buffer and the video stream buffer are dynamically set using the threshold and data from the transport stream.

27. The apparatus of claim 26, wherein the transport stream is an MPEG-2 data stream.

28. The apparatus of claim 26, wherein the receiving means is configured for connection to a network.

29. The apparatus of claim 28, wherein the network is an internet.

30. A data processing system for processing a transport stream comprising:

reception means for receiving a transport stream, wherein a plurality of data packets, containing audio data and video data, are in the transport stream;

placement means for placing data from the plurality of data packets in the transport stream into a second plurality of data packets, wherein each data packet, has a size;

limiting means for dynamically limiting the size of each data packet in the second plurality of data packets using a threshold and data from the transport stream, wherein the selected size of the data packet is optimized for processing within the data processing system.

31. A computer program product for use with a data processing system for, the computer program product comprising:
   a computer usable medium;
   first instructions for receiving a transport stream, wherein a plurality of data packets, containing audio data and video data, are in the transport stream;
   second instructions for placing data from the plurality of data packets in the transport stream into a data packet having a selected size;
   third instructions for limiting the selected size of the data packet using a threshold and data from the transport stream, wherein the selected sized of the data packet is optimized for processing within the data processing system and wherein the instructions are embodied within the computer usable medium.

32. A distributed data processing system comprising:
   an internet;
   a source connected to the internet, wherein the source generates a transport stream;
   a target apparatus connected to the internet, wherein the target apparatus includes:
      reception means for receiving the transport stream, wherein a plurality of data packets, containing audio data and video data, are within the transport stream;
      placement means for placing data from the plurality of data packets in the transport stream into a data packet having a selected size;
      limiting means for limiting the selected size of the data packet using a threshold and data from the transport stream, wherein the selected size of the data packet is optimized for processing within the data processing system.

33. The distributed data processing system of claim 32, wherein the source is a data processing system containing audio/visual data.

34. The distributed data processing system of claim 33, wherein the transport stream is an MPEG-2 data stream.

35. The distributed data processing system of claim 32, wherein the placement means comprises:
   first means for placing the plurality of data packets from the transport stream in a data buffer;
   second means for placing audio data within the plurality of data packets in the buffer into an audio stream buffer; and
   third means for placing video data within the plurality of data packets in the buffer into a video stream buffer.

36. A method in a data processing system for processing a transport stream, the method comprising the data processing system implemented steps of:
   receiving a transport stream, wherein a plurality of data packets, containing audio data and video data, are located within the transport stream;
   coalescing data from the plurality of data packets in the transport stream into a data packet having a maximum packet size;
   limiting data placed into the data packet based on the data from the transport stream, wherein the data packet has a size that is equal to or less than the maximum packet size and wherein the data packet is optimized for processing within the data processing system.

37. The method of claim 36, wherein step limiting date is performed in response to encountering a presentation step.

38. The method of claim 36, wherein step limiting date is performed in response to an overflow situation.

39. The method of claim 36, wherein the step of limiting data is performed in response to an audio under-run state.

* * * * *

UNITED STATES PATENT AND TRADEMARK OFFICE
CERTIFICATE OF CORRECTION

PATENT NO. : 6,021,440
DATED : February 1, 2000
INVENTOR(S) : Post et al

Page 1 of 2

It is certified that error appears in the above-identified patent and that said Letters Patent is hereby corrected as shown below:

Col. 2, line 40, insert -- which -- before "the";

Col. 2, line 59, replace "MPEC" with -- MPEG --;

Col. 9, line 8, insert -- the -- before "data";

Col. 9, line 10, insert -- the -- before "data";

Col. 9, line 52, replace "sized" with -- size --;

Col. 9, line 55, insert -- the -- before "data";

Col. 9, line 57, insert -- the -- before "data";

UNITED STATES PATENT AND TRADEMARK OFFICE
CERTIFICATE OF CORRECTION

PATENT NO. : 6,021,440
DATED : February 1, 2000
INVENTOR(S) : Post et al

It is certified that error appears in the above-identified patent and that said Letters Patent is hereby corrected as shown below:

Col. 11, line 4, after "system" delete "for";

Col. 11, line 16, replace "sized" with - - size - -;

Col. 12, line 29, insert - - the - - before "step";

Col. 12, line 29, replace "date" with - - data - -;

Col. 12, line 31, insert - - the - - before "step";

Col. 12, line 31, replace "date" with - - data - -.

Signed and Sealed this

Thirtieth Day of January, 2001

Attest:

Q. TODD DICKINSON

*Attesting Officer*        *Director of Patents and Trademarks*